3,408,392
PREPARATION OF α,β - UNSATURATED CARBOXYLIC ACIDS WITH A MOLYBDENUM-ANTIMONY - VANADIUM - OXYGEN TERNARY CATALYST
Kazuo Yamagishi, Tokyo, and Kouzou Sakakibara, Iwao Abe, and Masayoshi Kubo, Saitama-ken, Japan, assignors to Dai Cellu Kabushiki Kaisha, Higashi-ku, Osaka-shi, Japan
No Drawing. Filed Aug. 2, 1965, Ser. No. 476,690
Claims priority, application Japan, Aug. 11, 1964, 39/44,670
2 Claims. (Cl. 260—530)

This invention relates to a process of catalytically preparing α,β-unsaturated carboxylic acid such as acrylic acid, methacrylic acid and their related compounds from the corresponding unsaturated aldehydes by contact thereof with a catalyst in gaseous state.

In respect to the technically extensive application of α,β-unsaturated carboxylic acids, especially acrylic and methacrylic acid, many patents for the preparing method have already appeared.

Almost all these patents are characterized in using the catalyst in the process for specially preparing unsaturated carboxylic acids by catalytic oxidation from unsaturated carbonyl compounds, especially the process concerning the catalytic oxidation with molybdenum-cobalt oxides as seen in British Patent 878,082, (Distillers Co.). As mentioned in Example 9 of the specification of British Patent 878,802, the invention urges the preparing technique for the oxidation of acrolein with a catalyst consisting of molybdenum-vanadium oxides (Mo:V=1:1), but the yield of acrylic acid is somewhat low being only 28.5 percent. Further, upon using this catalyzer, a considerable amount of acrolein seems to be converted into formic acid and acetic acid. According to our experimental confirmation, it was determined that 25 percent of the organic acids formed was acetic acid. Therefore, such catalyst is not preferable for the formation of acrylic acid.

From these points, the applicants have studied on the catalytic oxidation of α,β-unsaturated aldehydes, especially of acrolein, and it has been found that excellent results are obtainable with the following metallic oxide catalyst:

$$Mo_aV_bSb_cO_d$$

wherein the catalysts composed of two elements—molybdenum and vanadium are not rather effective for the formation of α,β-unsaturated carboxylic acids such as acrylic acid. The addition of antimony to the said composition can promote selectively the increased formation of unsaturated carboxylic acid, and the appearance of byproducts such as acetic acid decrease. Thus, it has now been found that the yield of unsaturated carboxylic acids markedly increases. Finally, in the above general formula, when $a$ represents 12; $b$ is 1 to 25; $c$ is 0.1 to 10; $d$ is 38.65 to 113.5 (under the condition that the other elements are completely oxidized). In a particularly preferable catalyst, when $a$ represents 12, $b$ is 8 to 17, and $c$ is 1 to 4.

The aforesaid catalyst may be replaced with the corresponding compounds or oxide mixture, further in combination with carriers such as Corundum, silica or alumina.

The said catalyst may also be produced by mixing molybdenum oxide, vanadium pentoxide and antimony oxide or by preparing from molybdates and other salts. Before employing this catalytic mixture or compounds, the raw materials are necessary to be preliminarily treated by being subjected to combustion at a temperature of 350–450° C.

In performing the process of the invention, a mixture of acrolein, steam and gaseous oxygen are contacted with the catalyst loaded in combustion tubes, or acrolein which is formed by the catalytic oxidation of propylene in gaseous state as an intermediary product is converted to the unsaturated carboxylic acid without further separation and condensation process as mentioned in the patent application publication No. 1762 (1964). It is well known that acrolein solution polymerizes in the presence of water. This drawback concerning polymerization loss of acrolein can be replaceable with the oxidation process as will be described as follows:

The amount of α,β-unsaturated aldehydes used in our invention may be present in a wide range, for example, 1 to 20 volume percent, preferably 2 to 15 volume percent. The amount of oxygen employed may also be present in a wide range, for example, 1 to 20 volume percent, preferably 2 to 15 volume percent. Said oxygen can be diluted with inert gas, for example, satisfactorily with air.

In regulation of the reaction, the reaction system is preferably diluted with nitrogen, propane, butane, carbon monooxide, carbon dioxide or steam. Steam or nitrogen are particularly desirable. The concentration of steam charged is at least 20 vol. percent.

The reaction is preferably carried out at a temperature higher than 250 to 450° C., and the contact time can be adjusted in a range of from 0.5 to 30 seconds.

The description of the process for preparing acrylic acid from acrolein will be given and this will be followed by specific examples of the process embodying the invention. Our invention is applicable to all processes concerning the oxidation of α,β-unsaturated aldehydes using the novel metal oxide catalyst of the present invention, and the following examples are given to illustrate the invention and are not intended to be limiting.

EXAMPLE 1

40.32 grams of molybdenum trioxide, 25.48 grams of vanadium pentoxide, 6.74 grams of antimony trioxide were mixed and well pulverized, and subsequently there was added to the mixture 15 ml. of water after which the mixture was kneaded.

After drying the mixture at 150° C., the resultant mass is pulverized. The raw material thus obtained is placed in an electric furnace, and the preliminary treatment was first carried out by passing 2 liters of air per minute at 400° C. for 4 hours. After cooling, the dried materials were converted to fine powder in the grade of 8 to 30 mesh, and was used in the oxidation of acrolein.

Acrolein employed in our invention was prepared by contacting a gaseous composition containing 9.0 percent of propylene, 51.0 percent of air and 40.0 percent of steam with the catalyst consisting of 20 percent of $Mo_{12}Fe_{4.5}Bi_{4.5}As_2$—oxide and 80 percent of silicic anhydride carrier at 405° C. for 24 secconds. In such process of oxidation mentioned above, the gaseous products obtained were estimated to be composed of, in volume percent, acrolein 6.51, nitrogen 44.78, steam 42.52 and others (acetaldehyde, carbon dioxide, carbon monoxide, unreacted propylene and oxygen). The gaseous products obtained can be employed as the said raw material for the synthesis of acrylic acid. By adjusting the gaseous composition with the addition of oxygen so that the ratio of acrolein to oxygen is equal to 1 to 1.125, the acrolein can be selectively oxidized in 1.6 seconds to acrylic acid with the said molybdenum-vanadium-antimony oxide catalyst in the reaction tube.

The reaction was tested under different reaction temperatures, the data are summarized as follows: No deterioration of the catalyset was recognized at 325° C. even for prolonged hours in the reaction.

| Reaction temperature, °C. | Total acids formed, Percent | Acrylic acid formed, Percent | Acetic acid formed, Percent | $CO_2$ and CO formed, Percent |
|---|---|---|---|---|
| 325 | 52.5 | 43.6 | 8.3 | 25.6 |
| 300 | 46.5 | 36.6 | 9.1 | 26.6 |
| 350 | 48.1 | 38.5 | 9.0 | 28.7 |
| 280 | 36.9 | 27.8 | 2.7 | 15.7 |

EXAMPLE 2

The preparation of the catalyst was carried out according to Example 9 of British Patent 903,034. Molybdenum trioxide and vanadium pentoxide in molar ratio (1:0.5) were mixed with the addition of water, and dried. The mixture was heated at 400° C. for 3 hours, and pulverized to fine powder to a grade of 8 to 30 mesh. The catalytic oxidation was carried out under the same procedure and conditions as mentioned in Example 1. When at 325° C., the reaction products obtained were estimated, in percent, the acrylic acid yield was 30.4, while the acetic acid yield was 7.3 and the carbon dioxide and carbon monooxide yield was 28.3. On the other hand, at 350° C., in percent acrylic acid obtained was 25.0 whereas acetic acid was 8.6.

EXAMPLE 3

A catalyst was prepared from 40.32 grams of molybdenum trioxide, 25.48 grams of vanadium pentoxide, and 9.76 grams of antimony trioxide by the same procedure as in Example 1, and the oxidation of acrolein was performed at 325° C. under the same process and conditions as in Example 1, yielding, in percent, total acids 45.0, of which acrylic acid was 36, acetic acid 8.6, and carbon dioxide and carbon monooxide were 26.7.

EXAMPLE 4

After preparing a catalyst from 40.32 grams of molybdenum trioxide, 25.48 grams of vanadium pentoxide in the manner employed in Example 1, the oxidation of acrolein was carried out at 325° C., yielding, in percent, total acids formed 43.0, of which acrylic acid was 32.3, acetic acid 8.3, while at 300° C., total acids were 45.5, of which acrylic acid was 35.1, and acetic acid 8.0, respectively.

What we claim is:

1. A process for preparing $\alpha,\beta$-unsaturated carboxylic acid comprising oxidizing an $\alpha,\beta$-unsaturated aldehyde with gaseous oxygen in the presence of a ternary catalyst having the chemical composition represented by the following formula $$Mo_aV_bSb_cO_d$$

wherein $a=12$; $b=1-25$; $c=0.1-10$ and $d=38.65-113.5$.

2. A process as claimed in claim 1, wherein $a=12$; $b=8-17$; and $c=1-4$.

References Cited

UNITED STATES PATENTS 3,087,964  4/1963  Koch et al. _____ 260—530

FOREIGN PATENTS 903,034  8/1962  Great Britain.

LORRAINE A. WEINBERGER, *Primary Examiner.*

R. K. JACKSON, *Examiner.*

V. GARNER, *Assistant Examiner.*